Figure 1:
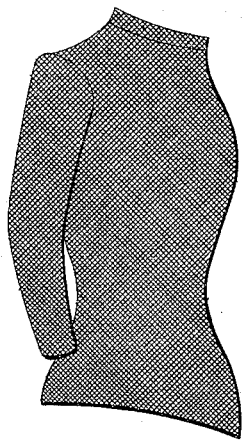

(No Model.)

E. A. BERRY.
JACKET FOR MAKING GARMENT PATTERNS.

No. 447,554.            Patented Mar. 3, 1891.

Witnesses  
Edwin L. Bradford  
E. Evereld Ellis

Ellen. A. Berry    Inventor

By her Attorney  
Wm. C. W. McIntire

UNITED STATES PATENT OFFICE.

ELLEN A. BERRY, OF BOSTON, MASSACHUSETTS, ASSIGNOR OF ONE-HALF TO SAMUEL W. McDANIEL, OF SAME PLACE.

JACKET FOR MAKING GARMENT-PATTERNS.

SPECIFICATION forming part of Letters Patent No. 447,554, dated March 3, 1891.

Application filed June 14, 1890. Serial No. 355,411. (No model.)

*To all whom it may concern:*

Be it known that I, ELLEN A. BERRY, a citizen of the United States, residing at Boston, in the county of Suffolk and State of Massachusetts, have invented certain new and useful Improvements in Devices to be Employed in Making Patterns for Garments; and I do hereby declare the following to be a full, clear, and exact description of the invention, such as will enable others skilled in the art to which it appertains to make and use the same.

My invention relates to a new and useful device to be employed in making patterns for garments.

In an application filed by me on the 13th day of November, 1889, Serial No. 330,115, I have claimed certain measuring and marking devices which I employ in connection with the invention forming the subject of my present application, and in another application filed by me on the 8th day of April, 1890, Serial No. 347,069, for a method for producing patterns for garments, I have shown and described the product forming the subject of this present application, but in neither of the other applications referred to has any claim therefor been made.

My present invention consists of a skeleton garment formed of elastic woven material hardened and stiffened in its minimum contracted and irregular form and proportions by the incorporation with the woven material of paraffine or an equivalent body, such as wax, whereby such garment may after it has been subjected to a limited degree of heat, say from 50° to 60° Fahrenheit, be manipulated or molded into any other form or shape.

The elastic property of the woven material of which the garment is formed renders it capable of being stretched in any given direction, and the incorporation with such woven material of paraffine, wax, or equivalent body gives to such body the property of ductility or plasticity, so that it may be molded to any desired form without liability to contraction.

The garments or skeletons forming the subject of my present invention are designed to be used in carrying out the method forming the subject-matter of my pending application, Serial No. 347,069, wherein one of my improved garments or skeletons, of a size somewhat smaller than the person to be fitted, is selected, and after being slightly warmed and after stretching the same sufficiently to enable it to be put upon the body of the person, it is then manipulated and molded to exact coincidence with the anatomical contour of such person, during which manipulation the paraffine or other similar body incorporated with the woven fabric cools and hardens and preserves the latter in the form it has acquired by the manipulation referred to. After the skeleton has been manipulated to assume the exact contour or outline of the body of the person being fitted, as above stated, the measuring and marking devices covered by my other application, Serial No. 330,115, hereinbefore referred to, are placed around or upon the body and lines for the seams clearly marked or outlined on the said skeleton. The marking devices are then removed, as well also as the skeleton or jacket, and the latter is cut on the lines thereon indicated. It is then flattened out and patterns therefrom may then be cut, and they will necessarily be accurate and perfect fitting.

I wish it to be distinctly understood that the gist of my invention lies in the new article of manufacture, which being constructed in the first place by a skillful person possessed of all the facilities for its manufacture is in condition to be laid away until needed and suitable to be transported to distant localities for use by ordinarily skilled persons or by unskilled persons following suitable instructions accompanying such article of manufacture.

Figure 2:
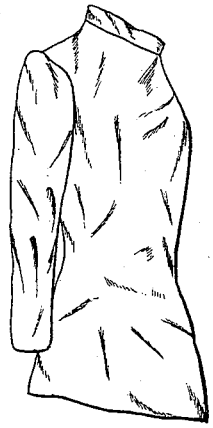

In the accompanying drawings, Figure 1 is a perspective view of a semigarment or jacket composed of ordinary Jersey cloth in its natural condition, and Fig. 2 represents the same jacket having incorporated with it paraffine, wax, or other suitable or equivalent material, and the shade lines in Fig. 2 represent the contractions or distortions in the garment resulting from the treatment of the same with the hot paraffine or wax.

I am aware that it has been proposed to use elastic garments to fit the body of a person for whom a pattern is desired, and to coat or saturate such garment while on the body of the person fitted with hot paraffine or wax, and to allow such paraffine or wax to cool and harden for the purpose of preventing such garment when removed from shrinking or returning to its original size and shape, and I am aware that such garment, when it has been allowed to cool and stiffen and has been removed from the person will represent substantially a mold of such person, and that when my improved skeleton is removed from the body to which it has been fitted will also be substantially a mold; but I desire it to be understood that I am laying no claim to any such mold, but confine myself to a body or product from which such a mold may be made by an ordinarily skilled person without the employment of any auxiliary devices or material.

It will be readily understood that my improved article of manufacture may be made in large quantities at a suitable factory by saturating skeleton garments of varying standard sizes with the paraffine or equivalent material and drying and hardening the same, after which they may be packed and shipped according to order and used at any desired locality.

What I claim as new, and desire to secure by Letters Patent, is—

A new article of manufacture consisting of a skeleton jacket of elastic material in its original and minimum size and form saturated and combined with a wax-like material to give to such jacket the property of plasticity and to enable the same to be molded and fitted, substantially as hereinbefore set forth.

In testimony whereof I affix my signature in presence of two witnesses.

ELLEN A. BERRY.

Witnesses:
　EDWIN H. DARLING,
　WM. A. SHEEHAN.